US012676547B2

(12) United States Patent
Du

(10) Patent No.: US 12,676,547 B2
(45) Date of Patent: Jul. 7, 2026

(54) TOTEM-POLE POWER FACTOR CORRECTION CIRCUIT, POWER SUPPLY EQUIPMENT

(71) Applicant: Aplus Power Technology (Hangzhou) Co., Ltd., Hangzhou City (CN)

(72) Inventor: Shuailin Du, Hangzhou City (CN)

(73) Assignee: Aplus Power Technology (Hangzhou) Co., Ltd., Hangzhou City (CN)

( * ) Notice: Subject to any disclaimer, the term of this patent is extended or adjusted under 35 U.S.C. 154(b) by 95 days.

(21) Appl. No.: 18/764,415

(22) Filed: Jul. 5, 2024

(65) Prior Publication Data

US 2025/0015713 A1 Jan. 9, 2025

(30) Foreign Application Priority Data

Jul. 5, 2023 (CN) .......................... 202310823383.1

(51) Int. Cl.
*H02M 1/42* (2007.01)
*H02M 1/00* (2007.01)
*H02M 7/23* (2006.01)
(52) U.S. Cl.
CPC ....... *H02M 1/4233* (2013.01); *H02M 1/0009* (2021.05); *H02M 7/23* (2013.01)

(58) Field of Classification Search
CPC .. H02M 1/0009; H02M 1/4233; H02M 7/219; H02M 7/23
See application file for complete search history.

(56) References Cited

U.S. PATENT DOCUMENTS

| | | | | |
|---|---|---|---|---|
| 10,505,459 B2 * | 12/2019 | Murakami | .......... | H02M 1/4233 |
| 10,910,958 B2 * | 2/2021 | Kobayashi | .............. | H02M 1/32 |
| 2019/0305671 A1 * | 10/2019 | Matsuura | .............. | H02M 1/083 |
| 2022/0037995 A1 * | 2/2022 | Usami | ................ | H02M 1/0009 |

* cited by examiner

*Primary Examiner* — Jue Zhang

(57) ABSTRACT

Embodiments of the present application discloses a totem-pole power factor correction circuit and a power supply equipment. The circuit includes a sampling unit and a detection control unit. The sampling unit includes a first sampling resistor and a second sampling resistor, the first sampling resistor being electrically connected between a second connection point and an anode of a first diode, and the second sampling resistor being electrically connected between the second connection point and a cathode of a second diode. The detection control unit may output a control signal through a voltage at both terminals of the first sampling resistor or the second sampling resistor or a voltage at both terminals of the first sampling resistor and the second sampling resistor connected in series to drive the third switch or the fourth switch to turn off, thereby effectively avoiding components damage caused by a late turn off of the third switch or the fourth switch.

20 Claims, 10 Drawing Sheets

TOTEM-POLE POWER FACTOR CORRECTION CIRCUIT, POWER SUPPLY EQUIPMENT

CROSS-REFERENCE TO RELATED APPLICATIONS

This application claims the benefit of priority of Chinese Patent Application No. 202310823383.1, filed on Jul. 5, 2023, the contents of which are incorporated by reference as if fully set forth herein in their entirety.

TECHNICAL FIELD

The present application relates to the field of power factor correction, and more particularly, to a totem-pole power factor correction circuit and a power supply equipment.

BACKGROUND

Totem-pole power factor correction (PFC) circuits are used more and more in server power supplies due to the high efficiency. A totem-pole PFC circuit is shown in FIG. 1. The diode D1 and the diode D2 are polarity diode, that is, when the polarity of input current flips, the on/off of the diode D1 and the diode D2 flips. the switching transistor S1 and the switching transistor S2 are fast switch, which achieves the energy control. On the basis of FIG. 1, the diode D1 and the diode D2 may be replaced with the MOS S3 and the MOS S4 as shown in FIG. 2. The MOS S3 and the MOS S4 operates as synchronous rectifiers, which are turned on when their respective body diodes conduct, thereby reducing the forward voltage drop of the switch.

In the prior art, for surge protection of the switch in the totem-pole PFC circuit, the totem-pole PFC circuit is generally provided with a bypass circuit as shown in FIG. 3, that is, the diode Db1 and the diode Db2 are added in front of the inductor L1, so that when a surge occurs in the totem-pole PFC circuit, surge energy can be bypassed to the bus capacitor C1 through the diode Db1, the diode Db2, and the respective switch. However, when the totem-pole PFC circuit is in an abnormal state, and the voltage of the polarity of input power supply suddenly flips, as shown in FIG. 4, the polarity of input power supply suddenly flips in the positive half cycle, the switch S4 isn't turned off in time, and the switch S4 and the diode Db2 are directly short-circuited. In this case, within a few hundred nanoseconds, a large impulse current is generated in the circuit, thereby causing damage to components in the circuit.

Therefore, how to reliably detect the abnormal state of the totem-pole PFC circuit and prevent the components in the circuit from being damaged in time is an urgent technical problem to be solved at present.

SUMMARY OF THE INVENTION

In view of the deficiencies of the prior art, the present application provides a totem-pole power factor correction circuit and a power supply equipment, which aim to solve the technical problem of component damage in a circuit when a polarity of an input power supply suddenly flips in the prior art.

To solve the above technical problem, in a first aspect, one or more embodiments of the present application provides a totem-pole power factor correction circuit including:

a first bridge including a first switch and a second switch connected in series, a connection point between the first switch and the second switch forming a first connection point;

a bypass unit connected in parallel with the first bridge and including a first diode and a second diode connected in series, a connection point between the first diode and the second diode forming a second connection point, the second connection point being electrically connected to a first terminal of an alternating current power supply;

a first inductor electrically connected between the first connection point and the second connection point;

a second bridge connected in parallel with the first bridge and including a third switch and a fourth switch connected in series, a connection point between the third switch and the fourth switch forming a third connection point, the third connection point being electrically connected to a second terminal of the alternating current power supply;

a sampling unit including a first sampling resistor electrically connected between the second connection point and an anode of the first diode and a second sampling resistor electrically connected between the second connection point and a cathode of the second diode;

a detection control unit electrically connected to both terminals of the first sampling resistor and both terminals of the second sampling resistor, respectively; wherein when a voltage at both terminals of the first sampling resistor is greater than a preset first voltage or less than the first voltage, the detection control unit outputs one or more control signals to drive the third switch or the fourth switch to turn off; when a voltage at both terminals of the second sampling resistor is greater than a preset second voltage or less than the second voltage, the detection control unit outputs the one or more control signals to drive the third switch or the fourth switch to turn off; or the detection control unit is electrically connected between the anode of the first diode and the first sampling resistor, and between the cathode of the second diode and the second sampling resistor, respectively; when the voltage at both terminals of the first sampling resistor and the second sampling resistor connected in series is greater than or less than a preset third voltage, the detection control unit outputs the one or more control signals to drive the third switch and the fourth switch to turn off.

Further, in the totem pole power factor correction circuit, the detection control unit includes a first comparator and a second comparator, and the control signals includes a first control signal and a second control signal;

wherein the first comparator includes a first input terminal receiving the voltage at both terminals of the first sampling resistor, a second input terminal receiving the first voltage, and a first output terminal outputting the first control signal to drive the third switch or the fourth switch to turn off;

the second comparator includes a third input terminal receiving the voltage at both terminals of the second sampling resistor, a fourth input terminal receiving the second voltage, and a second output terminal for outputting the second control signal to drive the third switch or the fourth switch to turn off.

Still further, in the totem pole power factor correction circuit, the first comparator further includes a first ground terminal and the second comparator further includes a second ground terminal; each of the first ground terminal and the second ground terminal is commonly grounded with the first terminal of the alternating current power supply.

Still further, in the totem pole power factor correction circuit, the first output terminal is configured to output the first control signal to drive the third switch to turn off; the second output terminal is configured to output the second control signal to drive the fourth switch to turn off.

Still further, in the totem pole power factor correction circuit, the control signals further include a third control signal, the third control signal being generated from the first control signal and the second control signal after a logical operation.

Further, in the totem pole power factor correction circuit, the detection control unit includes a third comparator;

wherein the third comparator includes a fifth input terminal receiving the voltage at both terminals of the first sampling resistor and the second sampling resistor connected in series, a sixth input terminal receiving the third voltage, and a third output terminal outputting the one or more control signal to drive the third switch and the fourth switch to turn off.

Still further, in the totem pole power factor correction circuit, the third comparator further includes a third ground terminal, the third ground terminal being commonly grounded with the first terminal of the alternating current power supply.

Still further, in the totem pole power factor correction circuit, the detection control unit further includes a driving circuit;

wherein the driving circuit receives an output control signal to drive the third switch and/or the fourth switch to turn off;

the driving circuit is electrically connected to the first output terminal of the first comparator and the second output terminal of the second comparator, respectively; or the driving circuit is electrically connected to the third output terminal of the third comparator.

Still further, in the totem pole power factor correction circuit, the detection control unit further includes an isolation circuit;

wherein the isolation circuit is provided between the driving circuit and the first comparator, and the driving circuit and the first comparator are not commonly grounded; and/or the isolation circuit is provided between the driving circuit and the second comparator, and the driving circuit and the second comparator are not commonly grounded; or the isolation circuit is provided between the driving circuit and a third comparator, and the driving circuit and the third comparator are not commonly grounded.

Further, in the totem pole power factor correction circuit, the one or more control signals are each a high level signal or a low level signal.

Further, in the totem pole power factor correction circuit, the first switch, the second switch, the third switch, and the fourth switch are each any one of an MOSFET switch, an IGBT switch, a GaN switch, or an SiC switch.

Still further, in the totem pole power factor correction circuit, the totem-pole power factor correction circuit is a multi-phase interleaved parallel circuit.

Still further, in the totem pole power factor correction circuit, the totem pole power factor correction circuit further including a third bridge and a second inductor;

wherein the third bridge is connected in parallel with the first bridge, the third bridge includes a fifth switch and a sixth switch connected in series, a fifth connection point is formed between the fifth switch and the sixth switch, the fifth connection point is electrically connected to the second connection point, and the second inductor is electrically connected between the second connection point and the fifth connection point.

Still further, in the totem pole power factor correction circuit, the first bridge operates alternately with the third bridge.

In a second aspect, one or more embodiments of the present application further provides a power supply equipment including the totem-pole power factor correction circuit of the first aspect.

In the totem-pole power factor correction circuit provided in the present application, a sampling unit and a detection control unit are additionally added in the circuit, the sampling unit is composed of a first sampling resistor and a second sampling resistor, the first sampling resistor is provided between a first diode in a bypass unit and a first terminal of an alternating current power supply, the second sampling resistor is provided between a second diode in the bypass unit and the first terminal of the alternating current power supply, and the detection control unit can accurately detect the voltage at both terminals of the first sampling resistor and of the second sampling resistor, or the voltage at both terminals of the first sampling resistor and the second sampling resistor connected in series, so as to determine whether a voltage abnormality occurs in the input power supply in the circuit, and timely output a control signal to drive a third switch and/or a fourth switch to turn off, thereby avoiding damage to components caused by late turn off of the third switch and the fourth switch, prolonging the service life of the components in the circuit, and reducing the service cost.

BRIEF DESCRIPTION OF THE DRAWINGS

In order that the technical solution of the embodiments of the present invention may be more clearly described, reference will now be made briefly to the accompanying drawings required for the description of the embodiments, and it will be apparent that the accompanying drawings in the following description are some of the embodiments of the present application, and other drawings may be made to those skilled in the art without involving any inventive effort.

DETAILED DESCRIPTION

In the following, the technical solutions in the embodiments of the present application will be clearly and completely described in connection with the accompanying drawings of the embodiments of the present application. It will be apparent that the described embodiments are some, but not all, embodiments of the present application. Based on the embodiments in the present application, all other embodiments obtained by a person of ordinary skill in the art without involving any inventive effort fall within the scope of the present application.

It is to be understood that when used in this specification and the accompanying claims, terms "comprise" and "include" indicate the presence of described features, integers, steps, operations, elements, and/or components, but do not rule out the presence or addition of one or more other features, integers, steps, operations, elements, components, and/or groups thereof.

It is also to be understood that the terms used in this specification is for the purpose of describing particular embodiments only and is not intended to limit the application. As used in the specification and the appended claims, the singular forms "a," "an," and "the" are intended to include the plural unless the context clearly dictates otherwise.

It is further to be understood that the term "and/or" as used in this specification and the appended claims refers to any and all possible combinations of one or more of the associated listed items, and includes such combinations.

Figure 1:
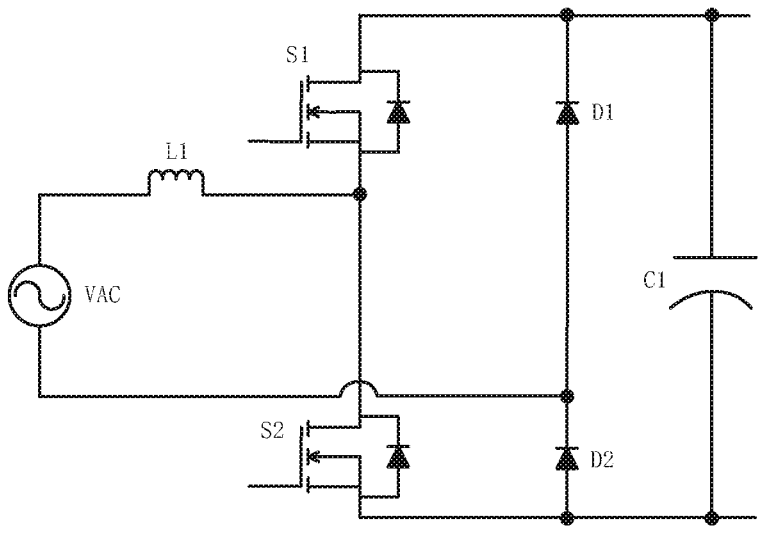
FIG. 1 is a topology diagram of a conventional totem-pole power factor correction circuit.
Figure 2:
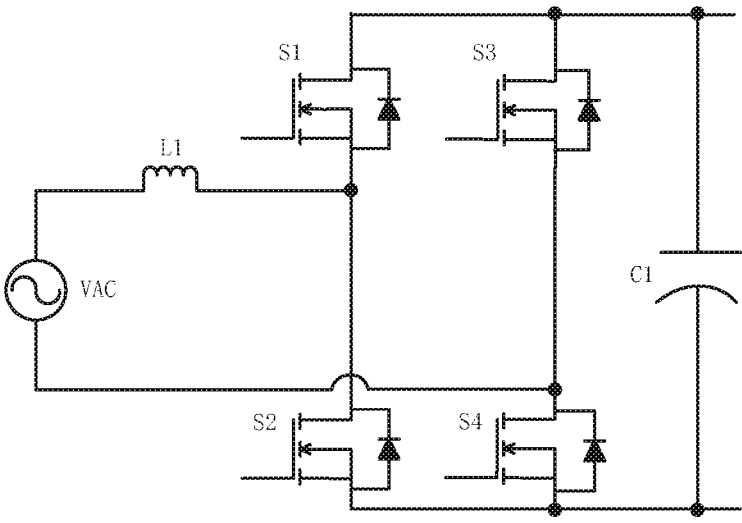
FIG. 2 is a topology diagram of another conventional totem-pole power factor correction circuit.
Figure 3:
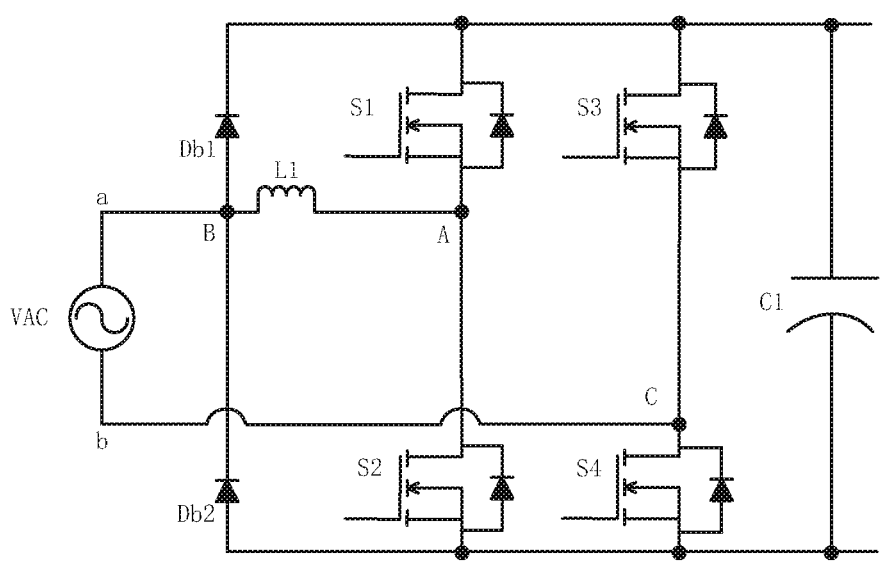
FIG. 3 is a topology diagram of another conventional totem-pole power factor correction circuit.
Figure 4:
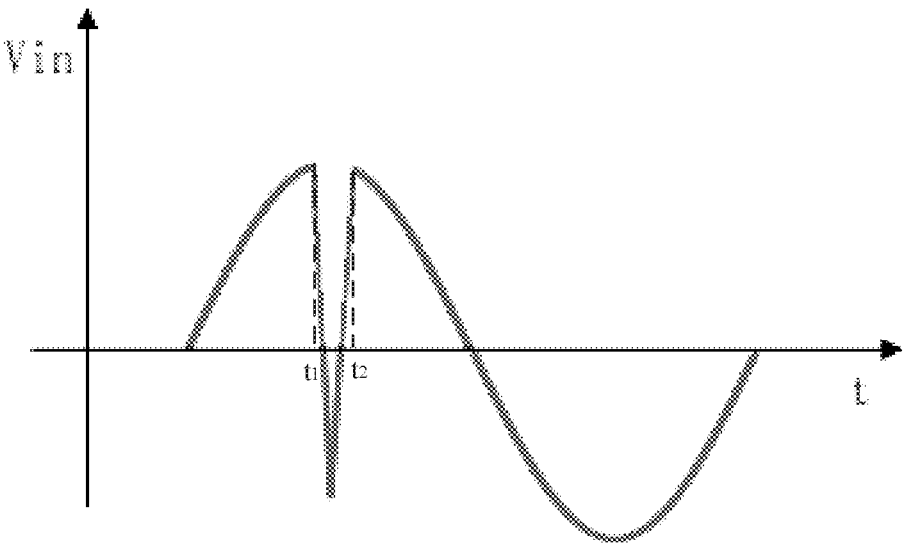
FIG. 4 is a voltage waveform diagram of an alternating current power supply VAC according to the present application.
Figure 5:
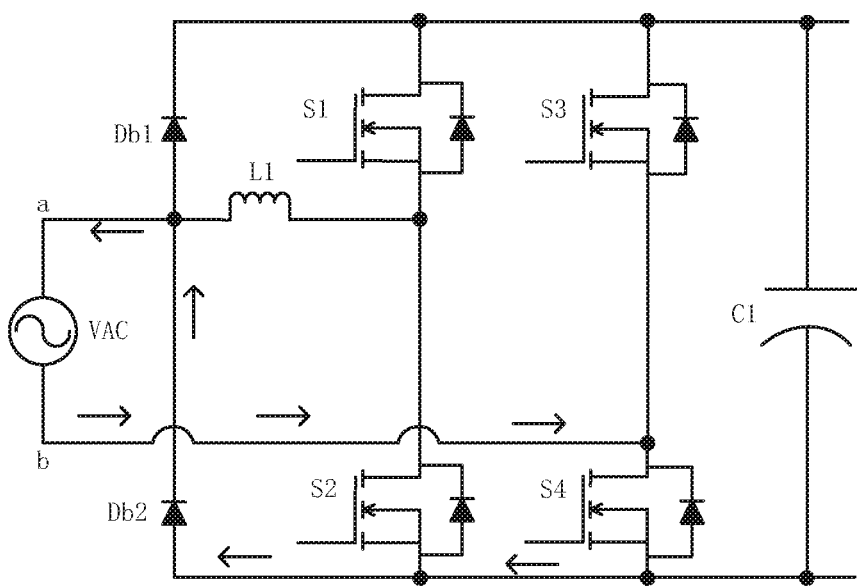
FIG. 5 is a topology diagram showing the current flow direction of the alternating current power supply VAC during the $t_1$~$t_2$ phase according to the present application.

In the prior art, as shown in FIG. 4, when the alternating current power supply VAC is in the positive half cycle and the fourth switching transistor S4 is in the turn-on state, the polarity of input alternating current power supply VAC suddenly flips from positive to negative. If the fourth switch S4 is not turned off in time, the current flows in the totem-pole power factor correction circuit in a direction shown in FIG. 5, and the current supplied from the alternating current power supply VAC flows out from the second terminal b and sequentially flows to the fourth switch S4 and the second diode Db2, and sequentially to the first terminal a of the alternating current power supply VAC. At this time, the alternating current power supply VAC is short-circuited through the fourth switch S4 and the second diode Db2, so that a large impulse current is inevitably generated in the circuit, and components in the circuit are easily damaged.

Figure 6:
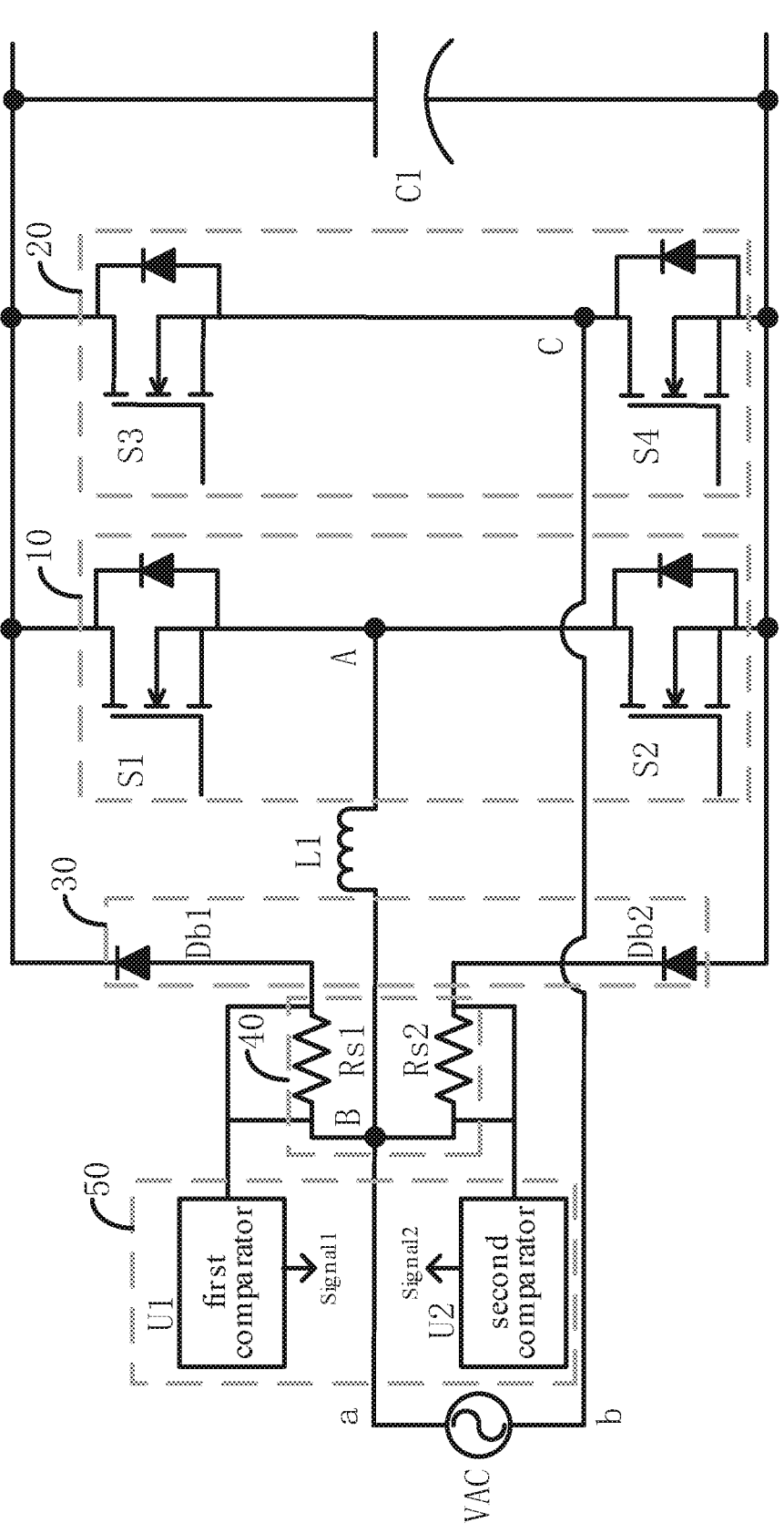
FIG. 6 is a topology diagram of a totem-pole power factor correction circuit according to the present application.

To solve the above problems, as shown in FIG. 6, one or more embodiments of the present application provides a totem-pole power factor correction circuit including a first bridge 10, a second bridge 20, a bypass unit 30, a first inductor L1, a sampling unit 40, and a detection control unit 50.

The first bridge 10 includes a first switch S1 and a second switch S2 connected in series, the connection point between the first switch S1 and the second switch S2 forming a first connection point A.

The bypass unit 30 is connected in parallel with the first bridge 10 and includes a first diode Db1 and a second diode Db2 connected in series, the connection point between the first diode Db1 and the second diode Db2 forming a second connection point B electrically connected to the first terminal a of the alternating current power supply VAC.

The first inductor L1 is electrically connected between the first connection point A and the second connection point B.

The second bridge 20 is connected in parallel with the first bridge 10 and include a third switch S3 and a fourth switch S4 connected in series, the connection point between the third switch S3 and the fourth switch S4 forming a third connection point C electrically connected to the second terminal b of the alternating current power supply VAC.

The sampling unit 40 includes a first sampling resistor Rs1 electrically connected between the second connection point B and the anode of the first diode Db1, and a second sampling resistor Rs2 electrically connected between the second connection point B and the cathode of the second diode Db2.

The detection control unit 50 is electrically connected to both terminals of the first sampling resistor Rs1 and to both terminals of the second sampling resistor Rs2, respectively. When the voltage at both terminals of the first sampling resistor Rs1 is greater than or less than a preset first voltage, the detection control unit 50 outputs a control signal to drive the third switch S3 or the fourth switch S4 to turn off. When the voltage at both terminals of the second sampling resistor Rs2 is greater than or less than a preset second voltage, the detection control unit 50 outputs the control signal to drive the third switch S3 or the fourth switch S4 to turn off.

The totem-pole power factor correction circuit converts the AC input power into output power to the load after receiving the AC input power supplied from the alternating current power supply VAC. The alternating current power supply VAC has a first terminal a and a second terminal b. When the alternating current power supply VAC is in the positive half cycle, the voltage of the first terminal a of the alternating current power supply VAC is higher than the voltage of the second terminal b, the current of the alternating current power supply VAC flows out from the first terminal a so that the first terminal a forms the input positive terminal of the totem-pole power factor correction circuit, and the current of the totem-pole power factor correction circuit flows into the alternating current power supply VAC via the second terminal b so that the second terminal b forms the input negative terminal of the totem-pole power factor correction circuit. When the alternating current power supply VAC is in the negative half cycle, the voltage of the first terminal a of the alternating current power supply VAC is lower than the voltage of the second terminal b, and the current of the alternating current power supply VAC flows out from the second terminal b so that the second terminal b constitutes the input positive terminal of the totem-pole power factor correction circuit, and the current of the totem-pole power factor correction circuit flows into the alternating current power supply VAC via the first terminal a so that the first terminal a constitutes the input negative terminal of the totem-pole power factor correction circuit. The totem-pole power factor correction circuit is electrically coupled to a load, that is, the load may be directly connected to the totem-pole power factor correction circuit or indirectly connected to the totem-pole power factor correction circuit.

Figure 8:
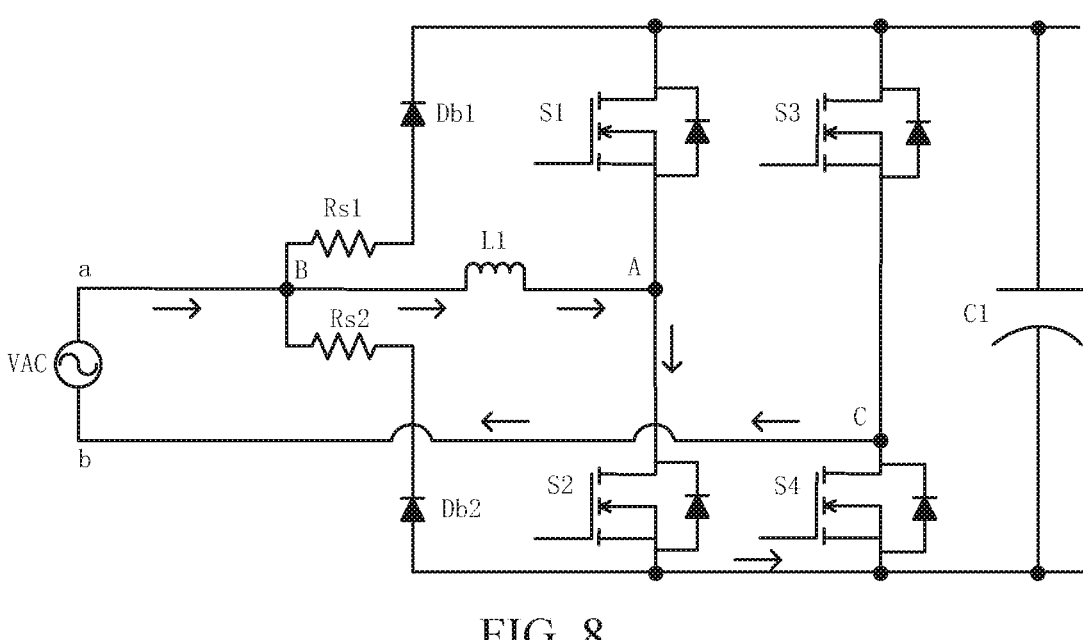
FIG. 8 is a topology diagram showing the current flow direction in the totem-pole power factor correction circuit according to the present application when the alternating current power supply VAC is in a positive half cycle.
Figure 9:
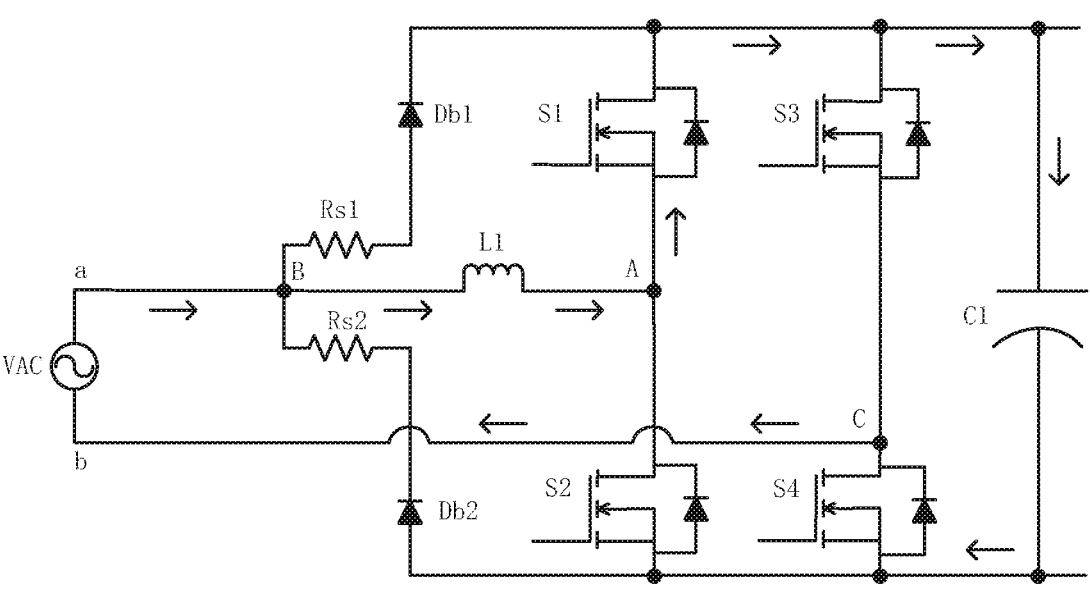
FIG. 9 is another topology diagram showing the current flow direction in the totem-pole power factor correction circuit according to the present application when the alternating current power supply VAC is in a positive half cycle.
Figure 10:
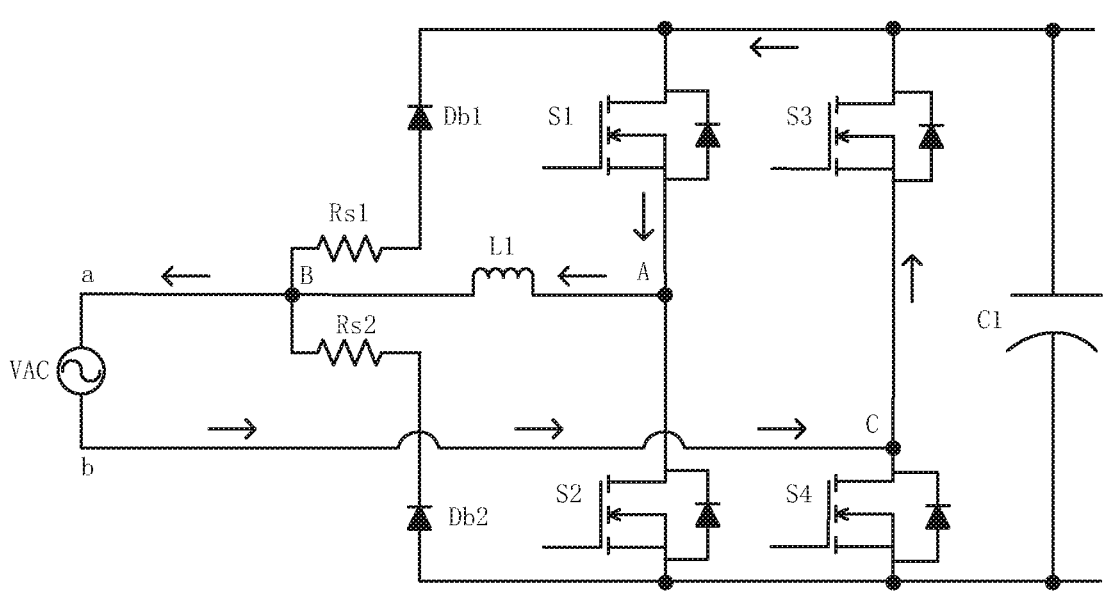
FIG. 10 is another topology diagram showing the current flow direction in the totem-pole power factor correction circuit according to the present application when the alternating current power supply VAC is in a negative half cycle.
Figure 11:
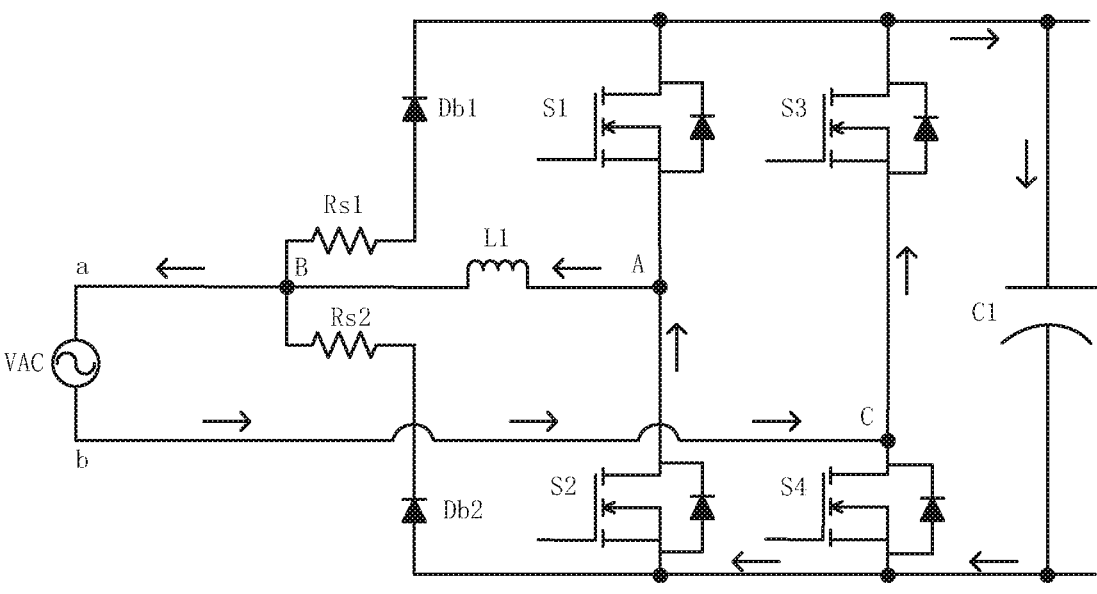
FIG. 11 is another topology diagram showing the current flow direction in the totem-pole power factor correction circuit according to the present application when the alternating current power supply VAC is in a negative half cycle.

In order to illustrate the current flow direction of the totem-pole power factor correction circuit provided in the present application, reference is made to FIG. 8, FIG. 9, FIG. 10, and FIG. 11. FIG. 8 is a topology diagram showing the current flow direction in the totem-pole power factor correction circuit when the alternating current power supply VAC is in the positive half cycle according to one or more embodiments of the present application. FIG. 9 is another topology diagram showing the current flow direction in the totem-pole power factor correction circuit when the alternating current power supply VAC is in the positive half cycle according to one or more embodiments of the present application. FIG. 10 is a topology diagram showing the current flow direction in the totem-pole power factor correction circuit when the alternating current power supply VAC is in a negative half cycle according to one or more embodiments of the present application. FIG. 11 is another topology diagram showing the current flow direction in the totem-pole power factor correction circuit when the alternating current power supply VAC is in the negative half cycle according to one or more embodiments of the present application. Meanwhile, the detection control unit 50 of FIGS. 8, 9, 10, and 11 is not shown for the convenience of explaining the current flow direction in the totem-pole power factor correction circuit provided in the present application.

Figure 7:
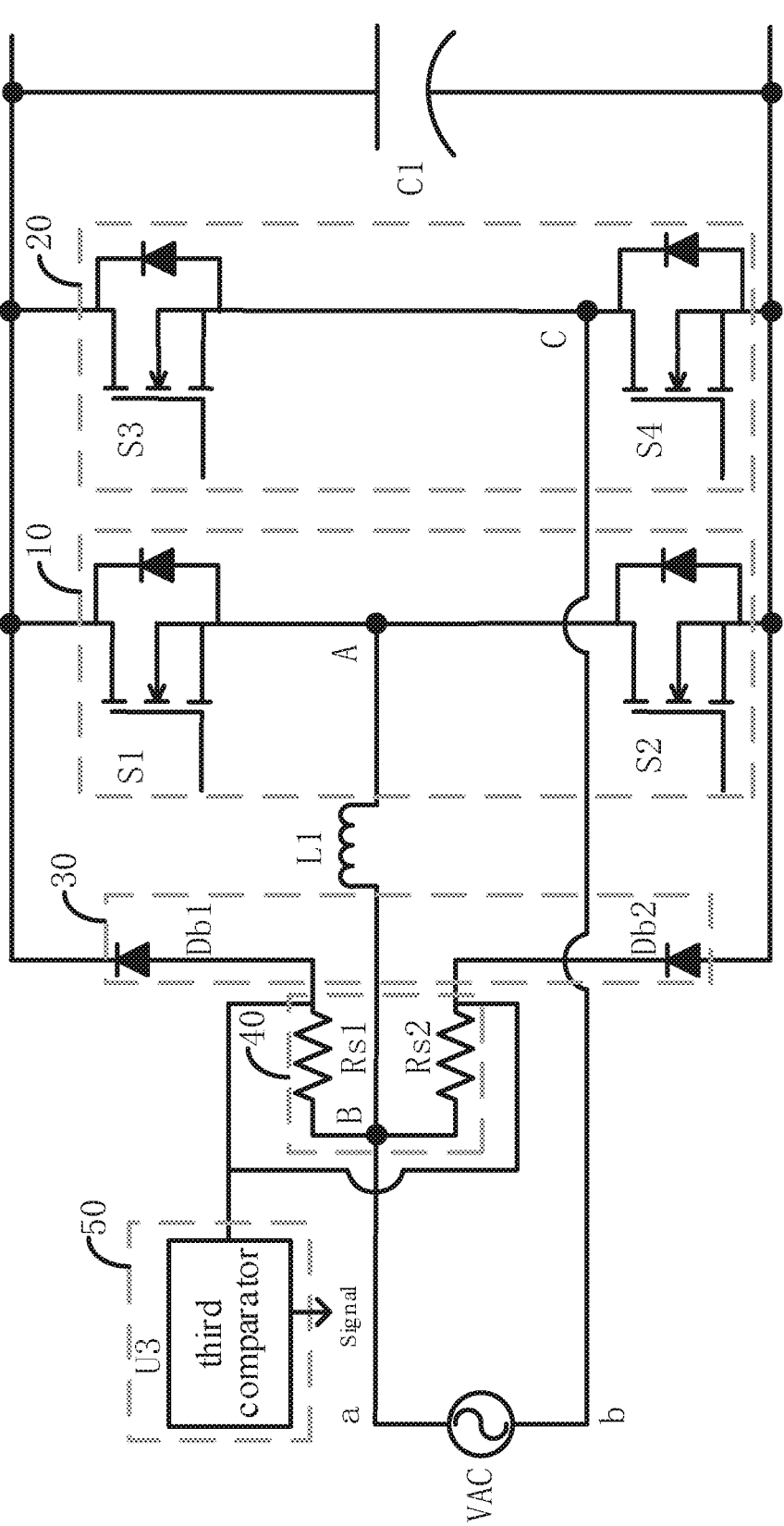
FIG. 7 is a topology diagram of another totem-pole power factor correction circuit according to the present application.

In the normal operation state of the totem-pole power factor correction circuit, the alternating current power supply VAC is in the positive half cycle, and the first inductor L1 is in the energy storage phase, as shown in FIG. 7, the first switch S1 and the third switch S3 are in the turn-off state, the second switch S2 and the fourth switch S4 are in the turn-on state, and the current supplied from the alternating current power supply VAC flows out from the first terminal a and sequentially flows to the first inductor L1, the second switch S2, the fourth switch S4, and the second terminal b of the alternating current power supply VAC to charge the first inductor L1.

In the normal operation state of the totem-pole power factor correction circuit, the alternating current power supply VAC is in the positive half cycle, and the first inductor L1 completes charging and is in the discharge phase, as shown in FIG. 8, the second switch S2 and the third switch S3 are in the turn-off state, the first switch S1 and the fourth switch S4 are in the turn-on state, and the current supplied from the alternating current power supply VAC flows out from the first terminal a and sequentially flows to the first inductor L1, the first switch S1, the bus capacitor C1, the fourth switch S4, and the second terminal b of the alternating current power supply VAC to realize charging of the bus capacitor C1.

In the normal operation state of the totem-pole power factor correction circuit, the alternating current power supply VAC is in the negative half cycle and the first inductor L1 is in the energy storage phase, as shown in FIG. 9, the first switch S1 and the third switch S3 are in the turn-on state, the second switch S2 and the fourth switch S4 are in the turn-off state, and the current supplied from the alternating current power supply VAC flows out from the second terminal b and sequentially flows to the third switch S3, the first switch S1, the first inductor L1 and the first terminal a of the alternating current power supply VAC to charge the first inductor L1.

In the normal operation state of the totem-pole power factor correction circuit, the alternating current power supply VAC is in the negative half cycle, and the first inductor L1 completes charging and is in the discharge phase, as shown in FIG. 10, the second switch S2 and the third switch S3 are in the turn-on state, the first switch S1 and the fourth switch S4 are in the turn-off state, and the current supplied from the alternating current power supply VAC flows out from the second terminal b and sequentially flows to the third switch S3, the bus capacitor C1, the second switch S2, the first inductor L1, and the first terminal a of the alternating current power supply VAC to realize charging of the bus capacitor C1.

Referring to FIG. 6, when a voltage abnormality occurs in the input power supply in the circuit, the voltage at both terminals of at least one of the first sampling resistor Rs1 and the second sampling resistor Rs2 in the sampling unit 40 changes, that is, when the voltage at both terminals of the first sampling resistor Rs1 is greater than the preset first voltage or less than the first voltage, the detection control unit 50 outputs a control signal to drive the third switch S3 or the fourth switch S4 to turn off. When the voltage at both terminals of the second sampling resistor Rs2 is larger than the preset second voltage or smaller than the second voltage, the detection control unit 50 outputs a control signal to drive the third switch S3 or the fourth switch S4 to turn off, thereby preventing the third switch S3 or the fourth switch S4 from being damaged due to failing to turn off in time, improving the service life of the components in the circuit, and reducing the use cost.

Note that in the present application, the first switch S1 and the second switch S2 may be turned off while the third switch S3 and the fourth switch S4 are turned off, thereby further protecting the components in the totem-pole power factor correction circuit.

For example, the alternating current power supply VAC is in the positive half cycle. In the $t_1$~$t_2$ phase in FIG. 4, as can be seen from FIG. 4, the voltage input to the totem-pole power factor correction circuit in this phase directly flips polarity from the positive half cycle polarity to the negative half cycle, and the fourth switch S4 is still in the turn-on state. At this time, the current resulted from the input voltage VAC through the fourth switch S4 and the second diode Db2 and the second sampling resistor Rs2 increases sharply, and a voltage is generated at both terminals of the second sampling resistor Rs2. The detection control unit 50 detects a voltage increase at both terminals of the second sampling resistor Rs2 and the voltage is higher than the preset second voltage. At this time, the detection control unit 50 can output a control signal to drive the fourth switch S4 to turn off, and then turn off the fourth switch S4 in time, thereby avoiding excessive current generation between the fourth switch S4 and the second diode Db2, and reducing damage to components in the circuit.

Similarly, when the alternating current power supply VAC is in the negative half cycle, when the first inductor L1 is charged until the discharge phase, if the polarity of voltage input to the totem-pole power factor correction circuit flips directly from the negative half cycle to the positive half cycle, the third switch S3 is still in the turn-on state, and the current resulted from the input voltage VAC through the third switch S3 and the first diode Db1 and the first sampling resistor Rs1 rapidly increases, and a voltage is generated at both terminals of the first sampling resistor Rs1. At this time, the detection control unit 50 detects that the voltage at both terminals of the first sampling resistor Rs1 increases and is higher than the preset first voltage, and the detection control unit 50 can output a control signal to drive the third switch S3 to turn off, thereby turning off the third switch S3 in time, thereby avoiding excessive current generated between the third switch S3 and the first diode Db1, and reducing damage to components in the circuit.

It should be noted that the preset first voltage and the preset second voltage may be set according to the sampling resistors Rs1 and Rs2 and the protection current. When the polarity of input voltage to the totem-pole power factor correction circuit suddenly flips, and the polarity switches, i.e., the third switch S3 or the fourth switch S4 is not turned off in time, the first sampling resistor Rs1 or the second sampling resistor Rs2 may have a voltage due to current flow therethrough, and when the voltage thereof is greater than or less than the preset voltage, the detection control unit 50 may output a control signal to drive the third switch S3 or the fourth switch S4 to turn off, thereby preventing excessive current from flowing between the third switch S3 or the fourth switch S4 and the corresponding diode in the bypass unit 30.

It should also be noted that the detection control unit 50 can detect a change in voltage at both terminals of the first sampling resistor Rs1 to output a control signal, thereby driving the third switch S3 or the fourth switch S4 to turn off. It is also possible for the detection control unit 50 to detect a change in the voltage at both terminals of the second sampling resistor Rs2 to output a control signal, thereby driving the third switch S3 or the fourth switch S4 to turn off. It is also possible for the detection control unit 50 to detect a change in the voltages at both terminals of the first sampling resistor Rs1 and of the second sampling resistor Rs2 at the same time to output a control signal, thereby driving the third switch S3 or the fourth switch S4 to turn off. The manner in which the control unit 50 outputs the control signal may be selected according to the actual application, to which this application is not specifically limited.

In some embodiments, as shown in FIG. 6, the detection control unit 50 includes a first comparator U1 and a second comparator U2, and there are two output control signals including a first control signal Signal1 and a second control signal Signal2. The first comparator U1 includes a first input terminal receiving a voltage at both terminals of the first sampling resistor Rs1, a second input terminal receiving the first voltage, and a first output terminal outputting the first control signal Signal1 to drive the third switch S3 or the fourth switch S4 to turn off. The second comparator U2 includes a third input terminal that receives a voltage at both terminals of the second sampling resistor Rs2, a fourth input terminal that receives the second voltage, and a second output terminal that outputs the second control signal Signal2 to drive the third switch S3 or the fourth switch S4 to turn off.

In the present embodiment, the first input terminal or the second input terminal are one of the non-inverting input terminal and the inverting input terminal of the first comparator U1, that is, the voltage at both terminals of the first sampling resistor Rs1 can be input to the non-inverting input terminal, or to the inverting input terminal of the first comparator U1, and the preset first voltage is the reference voltage.

Similarly, the third input terminal or the fourth input terminal are one of the non-inverting input terminal and the inverting input terminal of the second comparator U2, that is, the voltage at both terminals of the second sampling resistor Rs2 can be input to the non-inverting input terminal of the second comparator U2, or to the inverting input terminal of the second comparator U2, and the preset second voltage is the reference voltage.

When the polarity of input voltage to the totem-pole power factor correction circuit suddenly flips, the voltage at both terminals of the first sampling resistor Rs1 is lower than or higher than the preset first voltage, or the voltage at both terminals of the second sampling resistor Rs2 is lower than or higher than the preset second voltage. At this time, the first comparator U1 or the second comparator U2 outputs an opposite level signal, that is, the first control signal Signal1 or the second control signal Signal2, so that it is possible to drive the third switch S3 or the fourth switch S4 to turn off to avoid a short circuit in the circuit.

In some embodiments, the control signal(s) output by the detection control unit 50 may be a low-level signal or a high-level signal, which may be directly the first control signal Signal1 or the second control signal Signal2, or may be obtained by logical operation of the first control signal Signal1 and the second control signal Signal2.

That is, the first control signal Signal1 output by the first comparator U1 and the second control signal Signal2 output by the second comparator U2 can be directly used to drive the third switch S3 or the fourth switch S4 to turn off. The first control signal Signal1 output by the first comparator U1 may be used separately for driving the third switch S3 to turn off, and the second control signal Signal2 output by the second comparator U2 may be used separately for driving the fourth switch S4 to turn off. The first control signal Signal1 output by the first comparator U1 and the second control signal Signal2 output by the second comparator U2 may also be logically operated to generate a new control signal, such as a third control signal, for driving the third switch S3 or the fourth switch S4 to turn off. The control signal for driving the third switch S3 or the fourth switch S4 to turn off may be selected according to the actual application, and may be specifically selected according to the actual application, which is not specifically limited in the present application.

In some embodiments, the first comparator U1 further includes a first ground terminal, and the second comparator U2 further includes a second ground terminal. Each of the first ground terminal and the second ground terminal is commonly grounded with the first terminal a of the alternating current power supply VAC.

Figure 12:
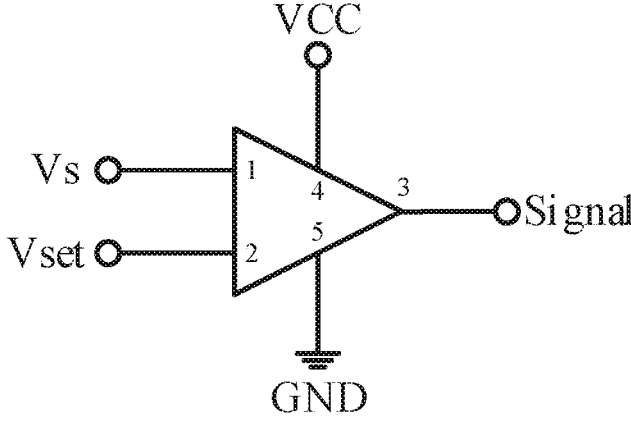
FIG. 12 is a topology diagram of a comparator in a totem-pole power factor correction circuit according to the present application.

In the present embodiment, each of the first ground terminal in the first comparator U1 and the second ground terminal in the second comparator U2 is the power supply terminal 5 of the comparator in FIG. 12, which is electrically connected to the first terminal a of the alternating current power supply VAC to be commonly grounded, the input terminal 1 of the comparator is a input terminal of one of the first comparator U1 and the second comparator U2, the power supply terminal 4 of the comparator in FIG. 12 is connected to the power supply VCC, and the output terminal 3 outputs a level signal Signal.

In the present application, by electrically connecting the first ground terminal and the second ground terminal to the first terminal a of the alternating current power supply VAC to be commonly grounded, respectively, the two terminals of the first sampling resistor Rs1 can be directly electrically connected and then electrically connected to one input terminal of the first comparator U1, and the input terminal of the first comparator U1 can directly detect the voltage at both terminals of the first sampling resistor Rs1. It is also possible that the two terminals of the second sampling resistor Rs2 are directly electrically connected and then electrically connect to an input terminal of the second comparator U2. Similarly, the input terminal can directly detect the voltage at both terminals of the second sampling resistor Rs2.

In some embodiments, the control signal further includes a third control signal generated by the logic operation of the first control signal Signal1 and the second control signal Signal2, that is, the generation of the third control signal may be triggered after the level signal output by at least one of the first comparator U1 and the second comparator U2 changes, thereby enabling driving the third switch S3 or the fourth switch S4 to turn off.

Figure 13:
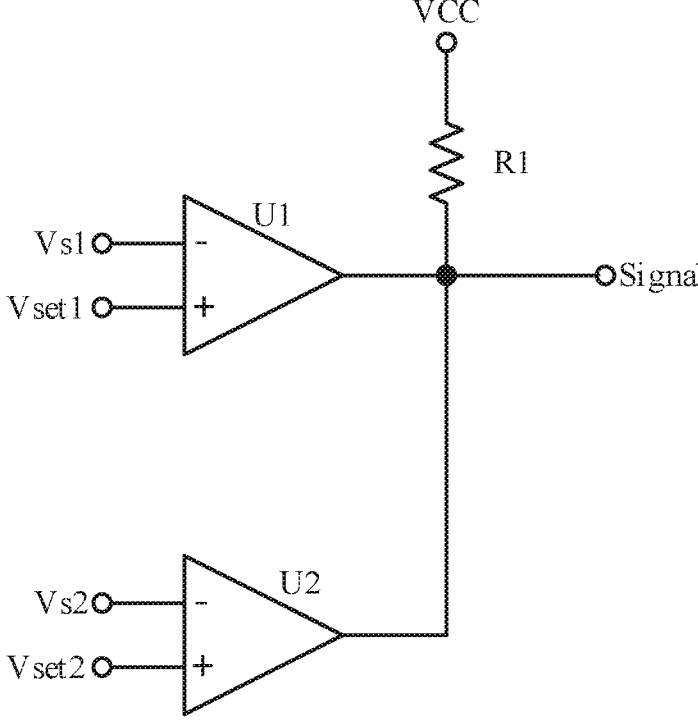
FIG. 13 is a topology diagram of a detection control unit in a totem-pole power factor correction circuit according to the present application.

In addition, since the comparator has usually an open-drain output mode, the driving circuit can directly have the pull-up resistor R1 connected as shown in FIG. 13. The inverting input terminal and the non-inverting input terminal of the first comparator U1 may receive the voltage Vs1 at both terminals of the first sampling resistor Rs1 and the first voltage Vset1, respectively, and output the first control signal Signal1. In this case, the inverting input terminal and the non-inverting input terminal of the second comparator U2 need to receive the voltage Vs2 at both terminals of the second sampling resistor Rs2 and the second voltage Vset2, respectively, and output the second control signal Signal2. The first control signal Signal1 and the second control signal Signal2 can be logically operated to generate a level signal Signal, that is, the third control signal, which can directly drive the third switch S3 or the fourth switch S4 to turn off.

Alternatively, the non-inverting input terminal and the inverting input terminal of the first comparator U1 may receive the voltage Vs1 at both terminals of the first sampling resistor Rs1 and the first voltage Vset1, respectively, and output the first control signal Signal1. In this case, the non-inverting input terminal and the inverting input terminal of the second comparator U2 need to receive the voltage Vs2 at both terminals of the second sampling resistor Rs2 and the second voltage Vset2, respectively, and output the second control signal Signal2. The first control signal Signal1 and the second control signal Signal2 may be logically operated to generate the level signal Signal, that is, the third control signal, and may directly drive the third switch S3 or the fourth switch S4 to turn off.

That is, the input terminals of the first comparator U1 and the second comparator U2 that receives the reference voltages must be input terminals of the same type, such as non-inverting input terminals or inverting input terminals.

In another embodiment, as shown in FIG. 7, the detection control unit 50 may also be electrically connected between the anode of the first diode Db1 and the first sampling resistor Rs1, and between the cathode of the second diode Db2 and the second sampling resistor Rs2, respectively. When the voltage at both terminals of the series-connected first sampling resistor Rs1 and second sampling resistor Rs2 is greater than or less than the preset third voltage, the detection control unit 50 may output a control signal to drive the third switch S3 and the fourth switch S4 to turn off.

In the present embodiment, for the current flow direction in the totem-pole power factor correction circuit, one can refer to FIG. 8, FIG. 9, FIG. 10, and FIG. 11, which are not described too much herein.

Specifically, when the voltage abnormality occurs in the input power supply in the circuit, and the polarity switch, i.e., the third switch S3 or the fourth switch S4 is not turned off in time, a current is generated through the first diode Db1 or the second diode Db2 of the bypass bridge. At this time, regardless of which diode is turned on, a voltage is generated at both terminals of the series-connected first sampling resistor Rs1 and second sampling resistor Rs2 in the sampling unit 40. When the voltage at both terminals of the series-connected first sampling resistor Rs1 and second sampling resistor Rs2 is greater than or less than a preset third voltage, the detection control unit 50 can output a control signal to drive the third switch S3 and the fourth switch S4 to turn off, thereby preventing the scenario where the third switch S3 or the fourth switch S4 have not been turned off in time and caused the components damage, prolonging the service life of the components in the circuit, and reducing the service cost.

In some embodiments, as shown in FIG. 7, the detection control unit includes a third comparator U3. The third comparator U3 includes a fifth input terminal, a sixth input terminal, a third output terminal, and a third ground terminal, the third ground terminal being commonly grounded with the first terminal of the alternating current power supply, the fifth input terminal receiving a voltage at both terminals of the series-connected first sampling resistor Rs1 and second sampling resistor Rs2, the sixth input terminal receiving the third voltage, and the third output terminal for outputting a control signal to drive the third switch S3 and the fourth switch S4 to turn off.

In the present embodiment, the fifth input terminal or the sixth input terminal are one of the non-inverting input terminal and the inverting input terminal of the third comparator U3, that is, the voltage at both terminals of the series-connected first sampling resistor Rs1 and second sampling resistor Rs2 can be inputted to either the non-inverting input terminal of the third comparator U3 or the inverting input terminal of the third comparator U3. And the third voltage is the reference voltage. When the polarity of input voltage to the totem-pole power factor correction circuit suddenly flips, the polarity switch, i.e., the third switch S3 or the fourth switch S4 does not turn off in time, and a current is generated through the first diode Db1 or the second diode Db2 of the bypass bridge. In this case, regardless of which diode turns on, the voltage at both terminals of the series-connected first sampling resistor Rs1 and second sampling resistor Rs2 is generated. When the voltage is lower than or higher than the preset third voltage, the third comparator U3 must output an opposite level signal, i.e., the control signal Signal. As a result, the third switch S3 and the fourth switch S4 can be driven to turn off to avoid a short circuit in the circuit.

At the same time, the third ground terminal is commonly grounded with the first terminal of the alternating current power supply so that the anode of the first diode Db1 and the cathode of the second diode Db2 can be directly connected with the first sampling resistor Rs1 and the second sampling resistor Rs2, and then directly electrically connected to one input terminal of the third comparator U3, and the input terminal can directly detect a voltage at both terminals of the series-connected first sampling resistor Rs1 and second sampling resistor Rs2, thereby detecting a driving abnormality of the polarity transistor, i.e., the third switch S3 or the fourth switch S4, and outputting a control signal, so that the third switch S3 and the fourth switch S4 can be driven to turn off.

In some embodiments, the detection control unit 50 further includes a driving circuit that is electrically connected to the first output terminal of the first comparator U1 and the second output terminal of the second comparator U2, respectively, when the detection control unit 50 is constituted by the first comparator U1 and the second comparator U2. The driving circuit may drive the third switch S3 or the fourth switch S4 to turn off according to the first control signal and the second control signal. When the detection control unit 50 is constituted by the third comparator, the driving circuit is electrically connected to the third output terminal of the third comparator U3, and the driving circuit can drive the third switch S3 and the fourth switch S4 to turn off according to the control signal of the third output terminal of the third comparator U3.

In some embodiments, the detection control unit 50 further includes an isolation circuit. The isolation circuit is provided between the driving circuit and the first comparator U1, and the driving circuit and the first comparator U1 are not commonly grounded; and/or the isolation circuit is provided between the driving circuit and the second comparator U2, and the driving circuit and the second comparator U2 are not commonly grounded, or the isolation circuit is provided between the driving circuit and the third comparator, and the driving circuit and the third comparator are not commonly grounded.

Specifically, by providing the isolation circuit, signal transmission between different potential circuits can be realized. In the example in which the detection control unit 50 includes the first comparator U1 and the second comparator U2, when the driving circuit and the ground terminal of the first comparator U1 are not commonly grounded, the isolation circuit is provided between the driving circuit and the first comparator U1 to transmit the first control signal to the driving circuit side. When the driving circuit and the ground terminal of the second comparator U2 are not commonly grounded, the isolation circuit is provided between the driving circuit and the second comparator U2 to transmit the second control signal to the driving circuit side. In the example in which the detection control unit 50 includes the third comparator U3, when the driving circuit and the ground terminal of the third comparator U3 are not commonly grounded, the isolation circuit is provided between the driving circuit and the third comparator U3 to transmit the control signal to the driving circuit side.

Figure 14:
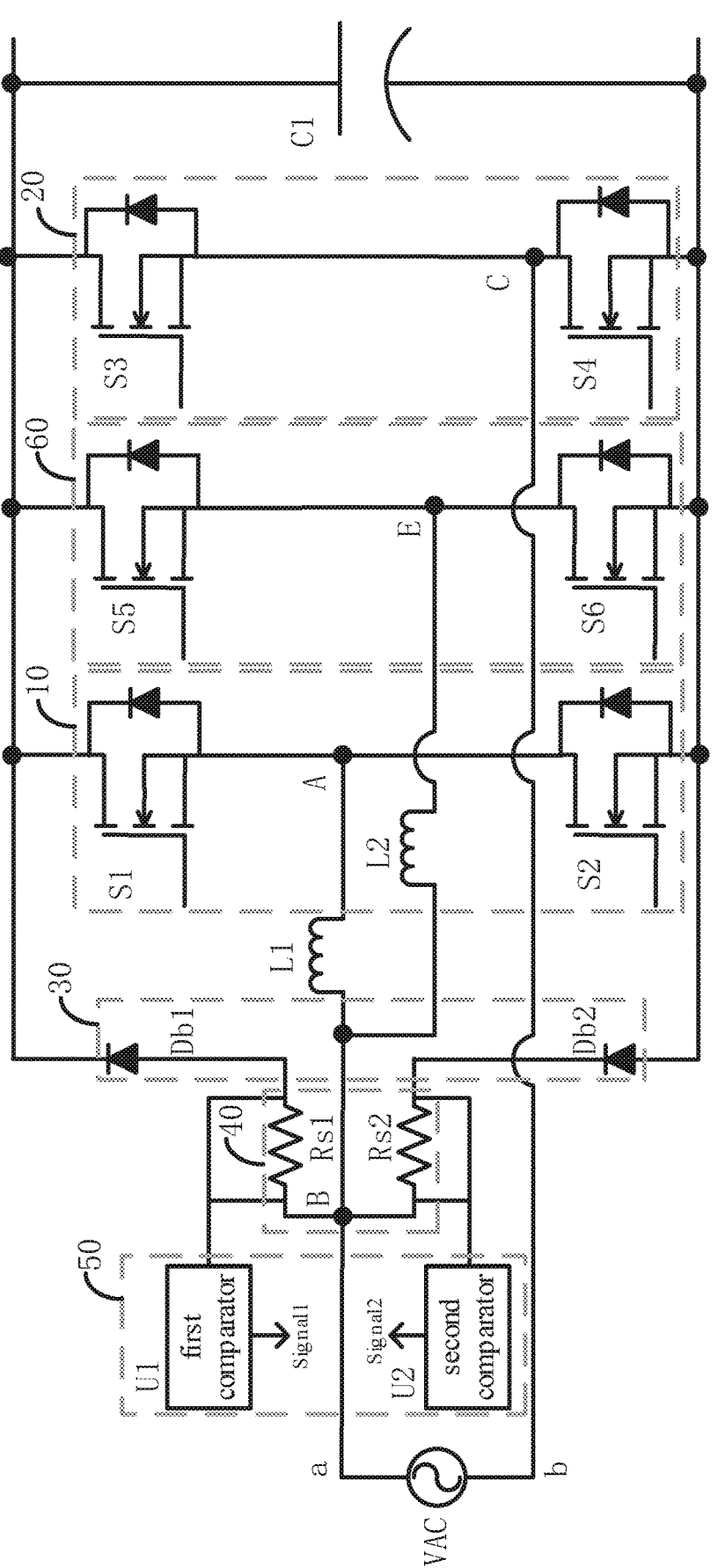
FIG. 14 is a topology diagram of another totem-pole power factor correction circuit according to the present application.
Figure 15:
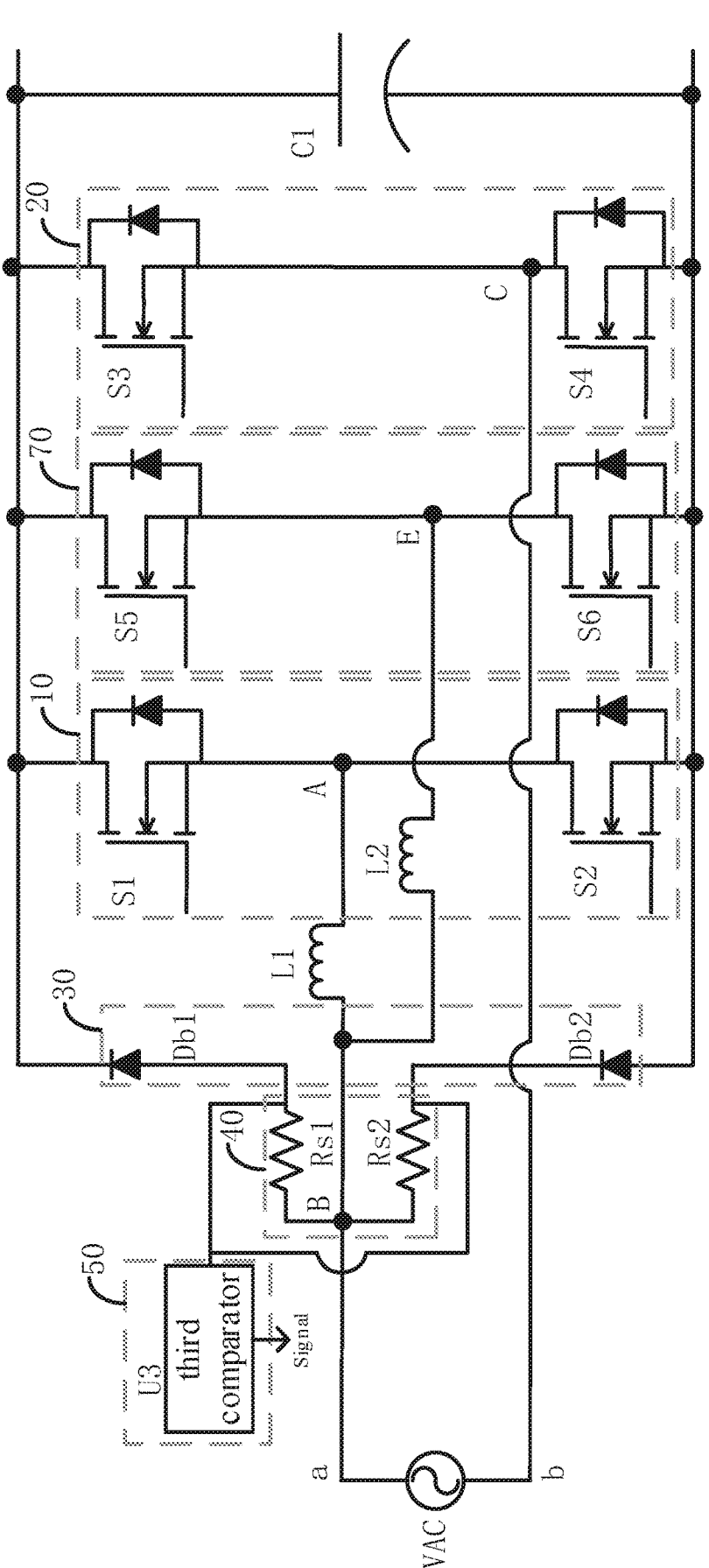
FIG. 15 is a topology diagram of another totem-pole power factor correction circuit according to the present application.

In some embodiments, as shown in FIGS. 14 and 15, the totem-pole power factor correction circuit may be a multi-phase interleaved parallel circuit.

In the present embodiment, FIG. 14 shows a case where the detection control unit 50 in the totem-pole power factor correction circuit is constituted by the first comparator U1 and the second comparator U2, and FIG. 15 shows a case where the detection control unit 50 in the totem-pole power factor correction circuit is constituted by the third comparator U3. In both cases, the totem-pole power factor correction circuit further includes a third bridge 60 and a second inductor L2, the third bridge 60 is connected in parallel with the first bridge 10, the third bridge 60 including a fifth switch S5 and a sixth switch S6 connected in series. A fifth connection point E is formed between the fifth switch S5 and the sixth switch S6, the fifth connection point E is electrically connected to the second connection point B. The second inductor L2 is electrically connected between the second connection point B and the fifth connection point E. Among them, the first bridge 10 and the third bridge 60 are interleaved operation alternatively. Meanwhile, when the third bridge 60 operates, the detection control unit 50 may turn off the third switch S3 and the fourth switch S4 while turning off the fifth switch S5 and the sixth switch S5.

In some embodiments, the first switch S1, the second switch S2, the third switch S3, the fourth switch S4, the fifth switch S5, and the sixth switch S6 may each be any one of, but not limited to an Metal-Oxide-Semiconductor Field-Effect Transistor, (MOSFET), an Insulated Gate Bipolar Transistor (IGBT), an GaN (gallium nitride) switch transistor, or an SiC (silicon carbide) switch transistor.

In summary, in the totem-pole power factor correction circuit provided in the present application, the sampling unit 40 and the detection control unit 50 are additionally added, where the sampling unit 40 is composed of the first sampling resistor Rs1 and the second sampling resistor Rs2, the first sampling resistor Rs1 is provided between the first diode Db1 in the bypass unit 30 and the first terminal a of the alternating current power supply VAC, the second sampling resistor Rs2 is provided between the second diode Db2 in the bypass unit 30 and the first terminal a of the alternating current power supply VAC, the detection control unit 50 can determine whether the voltages at both terminals of the first sampling resistor Rs1 and the second sampling resistor Rs2 exceed a preset value, or whether the voltages at both terminals of the series-connected first sampling resistor Rs1 and second sampling resistor Rs2 exceed the preset value, thereby abnormality in driving of the polarity transistor, i.e., the third switch S3 or the fourth switch S4 is, is determined, and a control signal is timely output to drive the third switch S3 or/and the fourth switch S4 to turn off, thereby effectively avoiding components damage caused by a late turn off of the third switch S3 or the fourth switch S4, the service life of the components in the circuit is improved, and the use cost is reduced.

In some embodiments, the present application also provides a power supply equipment including the totem-pole power factor correction circuit mentioned in the above embodiments. The switching power supply equipment may be a power adapter, a charging equipment, or the like, and the embodiment is not specifically limited thereto.

The above description is only specific embodiments of the present application, but the scope of protection of the present application is not limited thereto. Various equivalent modifications or substitutions may readily occur to those skilled in the art within the technical scope disclosed in the present application, and such modifications or substitutions are intended to be included within the scope of protection of the present application. Accordingly, the scope of protection of the present application should be subject to the scope of protection of the claims.

What is claimed is:

1. A totem-pole power factor correction circuit, comprising:

a first bridge comprising a first switch and a second switch connected in series, a connection point between the first switch and the second switch forming a first connection point;

a bypass unit connected in parallel with the first bridge and comprising a first diode and a second diode connected in series, a connection point between the first diode and the second diode forming a second connection point, the second connection point being electrically connected to a first terminal of an alternating current power supply;

a first inductor electrically connected between the first connection point and the second connection point;

a second bridge connected in parallel with the first bridge and comprising a third switch and a fourth switch connected in series, a connection point between the third switch and the fourth switch forming a third connection point, the third connection point being electrically connected to a second terminal of the alternating current power supply;

a sampling unit comprising a first sampling resistor electrically connected between the second connection point and an anode of the first diode and a second sampling resistor electrically connected between the second connection point and a cathode of the second diode;

a detection control unit electrically connected to both terminals of the first sampling resistor and both terminals of the second sampling resistor, respectively; wherein when a voltage at both terminals of the first sampling resistor is greater than a preset first voltage or less than the first voltage, the detection control unit outputs one or more control signals to drive the third switch or the fourth switch to turn off; when a voltage at both terminals of the second sampling resistor is greater than a preset second voltage or less than the second voltage, the detection control unit outputs the one or more control signals to drive the third switch or the fourth switch to turn off; or the detection control unit is electrically connected between the anode of the first diode and the first sampling resistor, and between the cathode of the second diode and the second sampling resistor, respectively; when the voltage at both terminals of the first sampling resistor and the second sampling resistor connected in series is greater than or less than a preset third voltage, the detection control unit outputs the one or more control signals to drive the third switch and the fourth switch to turn off.

2. The totem-pole power factor correction circuit according to claim 1, wherein the detection control unit comprises a first comparator and a second comparator, and the control signals comprises a first control signal and a second control signal;

wherein the first comparator comprises a first input terminal receiving the voltage at both terminals of the first sampling resistor, a second input terminal receiving the first voltage, and a first output terminal outputting the first control signal to drive the third switch or the fourth switch to turn off;

the second comparator comprises a third input terminal receiving the voltage at both terminals of the second sampling resistor, a fourth input terminal receiving the second voltage, and a second output terminal for outputting the second control signal to drive the third switch or the fourth switch to turn off.

3. The totem-pole power factor correction circuit of claim 2, wherein the first comparator further comprises a first ground terminal and the second comparator further comprises a second ground terminal; each of the first ground terminal and the second ground terminal is commonly grounded with the first terminal of the alternating current power supply.

4. The totem-pole power factor correction circuit according to claim 2, wherein the first output terminal is configured to output the first control signal to drive the third switch to turn off; the second output terminal is configured to output the second control signal to drive the fourth switch to turn off.

5. The totem-pole power factor correction circuit according to claim 2, wherein the control signals further comprise a third control signal, the third control signal being generated from the first control signal and the second control signal after a logical operation.

6. The totem-pole power factor correction circuit according to claim 2, wherein the detection control unit further comprises a driving circuit;

wherein the driving circuit receives an output control signal to drive the third switch and/or the fourth switch to turn off;

the driving circuit is electrically connected to the first output terminal of the first comparator and the second output terminal of the second comparator, respectively.

7. The totem-pole power factor correction circuit according to claim 6, wherein the detection control unit further comprises an isolation circuit;

wherein the isolation circuit is provided between the driving circuit and the first comparator, and the driving circuit and the first comparator are not commonly grounded; and/or the isolation circuit is provided between the driving circuit and the second comparator, and the driving circuit and the second comparator are not commonly grounded.

8. A power supply equipment comprising the totem-pole power factor correction circuit of claim 2.

9. The totem-pole power factor correction circuit according to claim 1, wherein the detection control unit comprises a third comparator;

wherein the third comparator comprises a fifth input terminal receiving the voltage at both terminals of the first sampling resistor and the second sampling resistor connected in series, a sixth input terminal receiving the third voltage, and a third output terminal outputting the one or more control signal to drive the third switch and the fourth switch to turn off.

10. The totem-pole power factor correction circuit according to claim 9, wherein the third comparator further comprises a third ground terminal, the third ground terminal being commonly grounded with the first terminal of the alternating current power supply.

11. The totem-pole power factor correction circuit according to claim 9, wherein the detection control unit further comprises a driving circuit;

wherein the driving circuit receives an output control signal to drive the third switch and/or the fourth switch to turn off;

the driving circuit is electrically connected to the third output terminal of the third comparator.

12. The totem-pole power factor correction circuit according to claim 11, wherein the detection control unit further comprises an isolation circuit;

wherein the isolation circuit is provided between the driving circuit and the third comparator, and the driving circuit and the third comparator are not commonly grounded.

13. A power supply equipment comprising the totem-pole power factor correction circuit of claim 9.

14. The totem-pole power factor correction circuit according to claim 1, wherein the one or more control signals are each a high level signal or a low level signal.

15. The totem-pole power factor correction circuit according to claim 1, wherein the first switch, the second switch, the third switch, and the fourth switch are each any one of an MOSFET switch, an IGBT switch, a GaN switch, or an SiC switch.

16. The totem-pole power factor correction circuit according to claim 1, wherein the totem-pole power factor correction circuit is a multi-phase interleaved parallel circuit.

17. The totem-pole power factor correction circuit of claim 16, further comprising a third bridge and a second inductor;

wherein the third bridge is connected in parallel with the first bridge, the third bridge comprises a fifth switch and a sixth switch connected in series, a fifth connection point is formed between the fifth switch and the sixth switch, the fifth connection point is electrically connected to the second connection point, and the second inductor is electrically connected between the second connection point and the fifth connection point.

18. The totem-pole power factor correction circuit according to claim 17, wherein the first bridge is interleaved operation with the third bridge.

19. A power supply equipment comprising the totem-pole power factor correction circuit of claim 16.

20. A power supply equipment comprising the totem-pole power factor correction circuit of claim 1.

\* \* \* \* \*